United States Patent

Ichizuka et al.

[11] Patent Number: 5,444,128
[45] Date of Patent: Aug. 22, 1995

[54] WATER-SEALING SHEET

[75] Inventors: Isamu Ichizuka; Shuitsu Takahashi; Kouzi Hara; Hiroshi Waki; Shinji Kobe; Tadayuki Sakurada; Yoshitaka Okouchi; Ken Ohkubo; Hiroshi Shimizu, all of Tokyo, Japan

[73] Assignees: Asahi Denka Kogyo Kabushiki Kaisha; Riken Vinyl Industry Co., Ltd., both of Tokyo, Japan

[21] Appl. No.: 120,538

[22] Filed: Sep. 14, 1993

[30] Foreign Application Priority Data

Sep. 14, 1992 [JP] Japan .................. 4-245268

[51] Int. Cl.⁶ .............. C08K 5/10; C08L 27/06; C08L 75/08
[52] U.S. Cl. ...................... 524/507; 524/297; 525/129
[58] Field of Search ............. 525/129; 524/297, 507

[56] References Cited

U.S. PATENT DOCUMENTS 5,075,373 12/1991 Takemori .................. 525/57

FOREIGN PATENT DOCUMENTS

| 018656 | 2/1978 | Japan | 525/129 |
| 147570 | 9/1982 | Japan . | |
| 120653 | 7/1984 | Japan . | |
| 044575 | 3/1985 | Japan | 525/129 |
| 185532 | 8/1986 | Japan | 525/129 |

Primary Examiner—David Buttner
Attorney, Agent, or Firm—Young & Thompson

[57] ABSTRACT

A water-sealing sheet comprising a water-swelling resin obtained by kneading together 10 to 97% by weight of a non-water-swelling thermoplastic resin, preferably vinyl chloride resin, containing 80 to 200 parts by weight of a plasticizer based on 100 parts by weight of the non-waterswelling thermoplastic resin, and 3 to 90% by weight of a water-swelling urethane resin. The urethane resin is a prepolymer having isocyanate groups in which the content of terminal NCO groups amounts to 1 to 12%, preferably 2 to 7%, obtained by the reaction of polyisocyanate with at least one polyether polyol of the formula $$R[(OR_1)_n OH]_p$$

wherein R is a polyhydric alcohol residue;

$(OR_1)_n$ is a polyoxyalkylene chain comprising oxyalkylene groups each having an oxyethylene group and an alkylene group carrying three or four carbon atoms, and wherein the content of the oxyethylene groups is 20 to 100% of the total molecular weight;

n is a number corresponding to the degree of polymerization of the oxyalkylene groups and giving a hydroxyl group equivalent of 200 to 2500; and p is 2 to 8, preferably 2 to 4.

3 Claims, 1 Drawing Sheet

WATER-SEALING SHEET

BACKGROUND OF THE INVENTION

1. Field of the Invention

The present invention relates to a water-sealing sheet used in the various civil engineering and construction works.

2. Description of the Prior Art

In the various civil engineering and construction works, water-sealing sheets for preventing water leakage have been conventionally used 1 between the segment of sealed tunnel and the second covering, 2 between water-sealing boards such as steel sheet pile and concrete, 3 between underground continuous wall and concrete, and 4 between the junction portion of box culvert and its outer peripheral portion.

Examples used as the above-mentioned water-sealing sheet include polyvinyl chloride sheets such as plasticized PVC sheet and ultra plasticized PVC sheet which are excellent in the elasticity and have the ductility to follow the crustal movement. However, in spite of the fact that these polyvinyl chloride sheets have the tensile strength of 140 kgf/cm$^2$ or more, they are easy to suffer from tears or pinholes by scratching during the processing work and water leakage cannot be prevented reliably.

On the other hand, water-sealing sheets comprising water-swelling urethane resin have been also used in the various civil engineering and construction works. However, although these sheets have durability, there are such problems as that they have not the sufficient elasticity, so that the following the crustal movement is insufficient.

SUMMARY OF THE INVENTION

The principal object of the present invention is, therefore, to provide an improved water-sealing sheet which can solve the problems of the conventional water-sealing sheet, that is, a water-sealing sheet capable of preventing the water leakage resulting from tears or pinholes by scratching and capable of following the crustal movement efficiently.

The present invention has achieved the above object by providing a water-sealing sheet comprising a water-swelling resin (C) obtained by kneading a non-water-swelling thermoplastic resin (A) and a water-swelling material (B).

The water-sealing sheet of the present invention is capable of preventing the water leakage resulting from tears or pinholes by scratching, which are disadvantages of the conventional water-sealing sheets made of polyvinyl chloride, and capable of following the crustal movement reliably.

Therefore, the water-sealing sheet of the present invention can be effectively used 1 between the segment of sealed tunnel and the second covering, 2 between water-sealing boards such as steel sheet pile and concrete, 3 between underground continuous wall and concrete, and 4 between the junction portion of box culvert and its outer peripheral portion, for preventing water leakage.

DETAILED DESCRIPTION OF THE INVENTION

Figure 1:
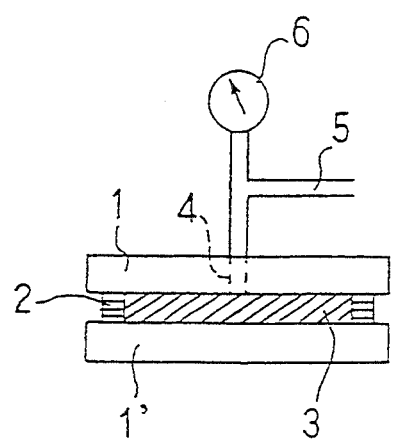
FIG. 1 is a side view of a test apparatus for carrying out the water-sealing test of the water-sealing sheet.

The present invention will be described in detail.

Examples of non-water-swelling thermoplastic resin (A) used in the water-sealing sheet of the present invention include vinyl chloride resins such as polyvinyl chloride and its copolymers; ethylene-vinyl acetate copolymers, polyethylene, polypropylene and their copolymers; EPDM; and silicone resins. It is preferable to use vinyl chloride resins. When vinyl chloride resins are used, it is preferred to employ plasticizers simultaneously.

Further, examples of water-swelling material (B) kneaded with the above-described non-water-swelling thermoplastic resin (A) include water-swelling urethane resin, carboxymethyl cellulose, polyvinyl alcohol, polyethylene glycol, hydroxyethyl cellulose, methyl cellulose, starch-acrylic acid copolymer, styrenemaleic anhydride copolymer and the salts of these copolymers, sodium polyacrylate, polyvinyl alcoholmaleic anhydride copolymer and their cross linked materials, vinyl ester-ethylene series unsaturated carboxylic acid copolymer and the saponificated materials thereof. It is preferable to use water-swelling urethane resin having high strength and water-swelling properties.

A typical example of the water-swelling urethane resin includes prepolymer(s) having isocyanate groups, in which the content of terminal NCO groups amounts to 1 to 12%, preferably 2 to 7%, obtained by the reaction of one or more polyether polyols represented by the following general formula and polyisocyanate;

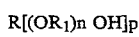

R[(OR$_1$)n OH]p wherein R represents a polyhydric alcohol residue; (OR$_1$)n represents a polyoxyalkylene chain comprising oxyalkylene groups each having an oxyethylene group and an alkylene group carrying three or four carbon atoms, provided that the content of the oxyethylene groups amounts to 20 to 100% of the total molecular weight;

n is a number corresponding to the degree of polymerization of the oxyalkylene groups and giving a hydroxyl group equivalent of 200 to 2500; and p is 2 to 8, preferably 2 to 4.

Examples of the polyhydric alcohol represented as R (polyhydric alcohol residue) in the above-described general formula include aliphatic dihydric alcohols such as ethylene glycol, propylene glycol, 1,4-butylene glycol and neopentyl glycol; trihydric alcohols such as glycerol, trioxyisobutane, 1,2,3-butanetriol, 1,2,3-pentanetriol, 2-methyl-1,2,3-propanetriol, 2-methyl-2,3,4-butanetriol, 2-ethyl-1,2,3-butanetriol, 2,3,4-pentanetriol, 2,3,4-hexanetriol, 4-propyl-3,4,5-heptanetriol, 2,4-dimethyl-2,3,4-pentanetriol, pentamethyl glycerol, pentaglycerol, 1,2,4-butanetriol, 1,2,4-pentanetriol and trimethylolpropane; tetrahydric alcohols such as erythritol, pentaerythritol, 1,2,3,4-pentanetetrol, 2,3,4,5-hexanetetrol, 1,2,3,5-pentanetetrol and 1,3,4,5-hexanetetrol; pentahydric alcohols such as adnite, arabitol and xylitol;

and hexahydric alcohols such as sorbitol, mannitol and iditol.

The polyether polyols represented by the abovedescribed general formula may be obtained by adding alkylene oxide having 3 to 4 carbon atoms and ethylene oxide to these polyhydric alcohols in such a conventional manner as to give the desired molecular weight and to give the desired content of the ethylene oxide group. Either random or block addition of the alkylene oxide having 3 to 4 carbon atoms and the ethylene oxide may be employed therefor. The content of the oxyethylene group based on the molecular weight of polyether polyols ranges 20 to 100% by weight. When the content of the oxyethylene group is less than 20%, the swelling ratio of the prepolymer having isocyanate groups obtained by reacting isocyanate becomes small, so that sufficient water-proofness cannot be obtained.

Examples of the polyisocyanate include any polyisocyanates such as 1,4-butane diisocyanate, 1,6-hexane diisocyanate, dicyclohexylmethane diisocyanate, cyclohexane diisocyanate, 1,5-bis-isocyanato-1,3,5-trimethylcyclohexane, 1,3-bis-(isocyanatomethyl)-benzene and methylcyclohexane diisocyanate. Fatty acid triisocyanate may be employed together partially. Preferable Examples of aromatic polyisocyanate include any aromatic diisocyanates such as 2,4- or 2,6-tolylene diisocyanate or their isomer mixtures; 4,4'-diphenylmethane diisocyanate, 3,3'-dimethyldiphenylmethane-4,4'-diisocyanate, m- or p-phenylene diisocyanate, 1,5-naphthylene diisocyanate and their isomers. Further, aromatic polyisocyanate having carbodiimide-, urethodione-, urethane-, urethoimine- or biuret group or isocyanurate rings may be employed alone or together.

The prepolymer having isocyanate groups thus obtained can be used independently or simultaneously with an active hydrogen compound by kneading.

The active hydrogen compound is polyol, polyamine or a mixture thereof each having 2 to 6 active hydrogen atoms per one molecule and having an average molecular weight per active hydrogen atoms of 30 to 15,000, for example, low-molecular weight diols or triols such as ethylene glycol, 1,4-butanediol, glycerol and trimethylol propane; polyalkylene glycols such as polypropylene glycol, ethylene oxide-propylene oxide copolymers; polymers of alkylene oxide such as ethylene oxide-propylene oxide and low-molecular weight triols such as glycerol, trymethylolpropane, 1,2-6-hexanetriol; low-molecular weight tetraols such as pentaerythritol or low-molecular weight hexaols such as solbitol; or polyamines such as ethylenediamine, 4,4'-methylenebis-1-chloroaniline or polymers of these polyamines and the above-described alkylene oxide.

In the reaction of the prepolymer having isocyanate groups and the active hydrogen compound, any wellknown catalyst for promoting the reaction of isocyanate group and an active hydrogen compound can be added. Examples of the catalyst to be added include triethylamine, triehtylenediamine, N-morpholine, stannous octate and dibutyl dilaurate. In connection with the ratio of the polyisocyanate and the active hydrogen compound in the above-described prepolymer having isocyanate groups, [NCO]/[H+] is preferably 0.8 to 2.0, more preferably 1.1 to 1.7.

Further, the above-described water-swelling urethane resin may further contain high molecular materials such as other urethane resins, epoxy resin and acryl resin, optionally, and additives of these resins such as calcium carbonate, clay, aluminium silicate, talc or titanium dioxide. Appropriate amount of color former and antioxidant can be also added thereto.

Regarding the water-swelling resin (C) used in the water-sealing sheet of the present invention, it is preferable to blend and knead 10 to 97% by weight of the above-described non-water-swelling thermoplastic resin (A) and 3 to 90% by weight of the above-described water-swelling material (B) [(A)+(B)=100% by weight].

Detailed description regarding the water-swelling resin (C) will be given in the case of using vinyl chloride resin as the non-water-swelling thermoplastic resin (A) and water-swelling urethane resin as the water-swelling material (B).

Examples of the preferable above-mentioned vinyl chloride resin include homopolymer of vinyl chloride, copolymer of vinyl chloride and other monomers and graft polymer of vinyl chloride and other monomers, and chlorinated compounds of the homopolymer, the copolymer or the graft polymer. The vinyl chloride resin preferably has an average polymerization degree of 400 to 4000. An average polymerization degree is preferably 500 to 3000, more preferably 700 to 2000. When the average polymerization degree is less than 400, the strength of the water-swelling resin (C) decreases, and when it is more than 4000, the workability deteriorates.

The vinyl chloride resin may be used in an amount of 10 to 97% by weight based on the mixture of the vinyl chloride resin and the water-swelling urethane resin, and it is preferably from 20 to 95% by weight, still preferably 30 to 90% by weight. When the amount of the vinyl chloride resin is less than 10% by weight, its workability etc. is lost, and the adjustment of hardness according to the plasticizer becomes difficult. Contrarily, when it exceeds 97% by weight, the water swellability deteriorates.

It is preferable to employ a plasticizer when vinyl chloride resin is used as the non-water-swelling thermoplastic resin (A). This plasticizer is not particularly limited. Examples of such a plasticizer are those usually employed when preparing vinyl chloride resin, for example, phthalates such as dioctyl phthalate and ditridecyl phthalate; trimellitates such as trioctyl trimellitate; pyromellitates such as tetra 2-ethylhexyl pyromellitate; and adipate which is a condensate of adipic acid and diol such as 1,2-propylene glycol, triethylene glycol, neopentyl glycol or the like.

The plasticizer may be added in an amount of 0 to 200 parts by weight, preferably 15 to 150 parts by weight, based on 100 parts by weight of the vinyl chloride resin. When it exceeds 200 parts by weight, bleeding occurs and watertightness decreases.

The above-mentioned water-swelling resin (C) may further contain additives generally added to the vinyl chloride resin. Examples of such additives include an organotin thermostabilizer such as dialkyltin mercaptide, dialkyltin malate and dialkyltin laurate; a metal soap such as calcium stearate, zinc stearate, cadmium stearate, barium stearate and lead stearate; an inorganic stabilizer such as lead tribasic sulfate, lead dibasic stearate, calcium hydroxide and calcium silicate; a chelating agent such as trisnonylphenylphosphite and alkylmonoallylphosphite; waxes such as ester wax and hydrocarbon wax; an epoxide compound such as soybean oil epoxide, linseed oil epoxide and bisphenolepoxide; and a filler such as calcium carbonate, talc, clay and mica. Pigment, antistatic agent, antioxidant, ultraviolet ray absorbing agent and the like may be also contained therein optionally.

The water-sealing sheet of the present invention is produced by molding the above-mentioned water-swelling resin (C) into the sheet form according to the conventional manner. There is no limitation to the form of the sheet, but the one having 0.5 to 2 mm in thickness, 60 to 120 cm in width and several meters to tens meters in length may be suitable for the ordinary sheet.

Further, it is preferable that the water-sealing sheet of the present invention has the tensile strength of 75 to 120 kgf/cm$^2$, as the elasticity suffices therein.

The present invention will be described in further detail with reference to Example and Test Example. However, the present invention should not be limited to the following Examples.

EXAMPLE 1

100 parts by weight of polyvinyl chloride having an average polymerization degree of 1450, 80 parts by weight of plasticizer di-(2-ethylhexyl)phthalate, 2.6 parts by weight of stabilizer for vinyl chloride and 40 parts by weight of water-swelling urethane resin were kneaded to thereby prepare a water-swelling resin (water-swelling polyvinyl chloride resin compound).

Sequentially, the compound thus obtained was extruded and molded by T-die extruder to thereby give a water-sealing sheet having the thickness of 1.3 mm. The water-sealing sheet thus obtained has a tensile strength of 88 kgf/cm$^2$.

TEST EXAMPLE 1

The water-stop of the water-sealing sheet of the present invention produced in the above Example 1 and a sheet made of plasticized polyvinyl chloride (average polymerization degree:2250) was compared with the use of the test apparatus shown in FIG. 1 as follows.

Between two transparent polyvinyl chloride boards 1, 1' (250×250×20 mm), a test sheet 3 (thickness:1.3 mm) provided with stainless spacer 2 (thickness:1.5 mm) surrounding it was held as shown in FIG. 1, and the upper and lower transparent polyvinyl chloride boards were fastened with a bolt (not shown in FIGS). The center of the test sheet 3 and the center of the upper transparent polyvinyl chloride board were provided with a water-passing hole 4 to thereby pass pressurized water through a pipe 5. In FIG. 1, 6 is a pressure gauge.

Figure 2:
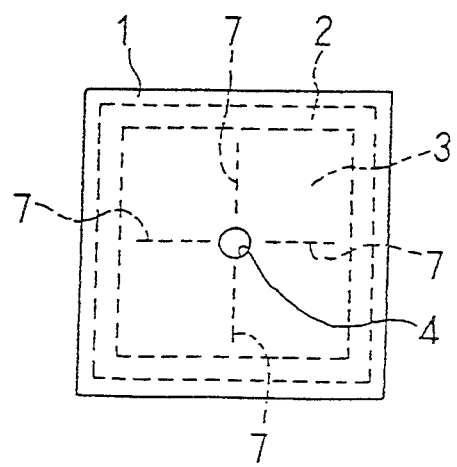
FIG. 2 is a plan view of the test apparatus shown in FIG. 1.

Following three kinds of sheets were used as test sheets;

1. the water-sealing sheet produced in Example 1,
2. the water-sealing sheet produced in Example 1 in which four cuts 7 having a length of 20 mm were provided in four directions as shown in FIG. 2, and
3. a sheet made of plasticized polyvinyl chloride as a blank.

When water was passed through the test apparatus, water leakage was recognized between two transparent polyvinyl chloride boards in all of the sheets mentioned above 1, 2 and 3 under the water pressure 0 kgf/cm$^2$.

Next, whole of the test apparatus was dipped in a water tank, and it was taken out after a certain period of time. Then, water was passed through the test apparatus again to thereby measure the pressure (waterproof pressure) when water leakage occurred. The results are as follows.

| Sheet | after 15 hours | after 7 days |
|---|---|---|
| 1 | 3.5 kgf/cm$^2$ | 9.0 kgf/cm$^2$ |
| 2 | 3.5 kgf/cm$^2$ | 9.0 kgf/cm$^2$ |
| 3 | 0 kgf/cm$^2$ | 0 kgf/cm$^2$ |

What is claimed is:

1. A water-sealing sheet comprising a waterswelling resin obtained by kneading together 10 to 97% by weight of a polyvinyl chloride containing 80 to 200 parts by weight of a plasticizer based on 100 parts by weight of said polyvinyl chloride, and 3 to 90% by weight of a water-swelling urethane resin which is a prepolymer having isocyanate groups in which the content of terminal NCO groups amounts to 1 to 12%, obtained by the reaction of polyisocyanate with at least one polyether polyol of the formula

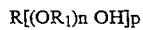

$$R[(OR_1)n\ OH]p$$

wherein R is a polyhydric alcohol residue;

(OR$_1$)n is a polyoxyalkylene chain comprising oxyalkylene groups each having an oxyethylene group and an alkylene group carrying three or four carbon atoms, and wherein the content of the oxyethylene groups is 20 to 100% of the total molecular weight;

n is a number corresponding to the degree of polymerization of the oxyalkylene groups and giving a hydroxyl group equivalent of 200 to 2500; and p is 2 to 8.

2. A water-sealing sheet as claimed in claim 1, wherein said content of terminal NCO groups is 2 to 7%.

3. A water-sealing sheet as claimed in claim 1, wherein p is 2 to 4.

* * * * *